March 7, 1950 D. C. HUBBARD 2,499,753
CHAIN TIGHTENING AND SECURING DEVICE
Filed May 2, 1946 4 Sheets-Sheet 1

Inventor
David C. Hubbard
By Robert H. Wendt
Atty.

March 7, 1950      D. C. HUBBARD      2,499,753
CHAIN TIGHTENING AND SECURING DEVICE
Filed May 2, 1946      4 Sheets-Sheet 2
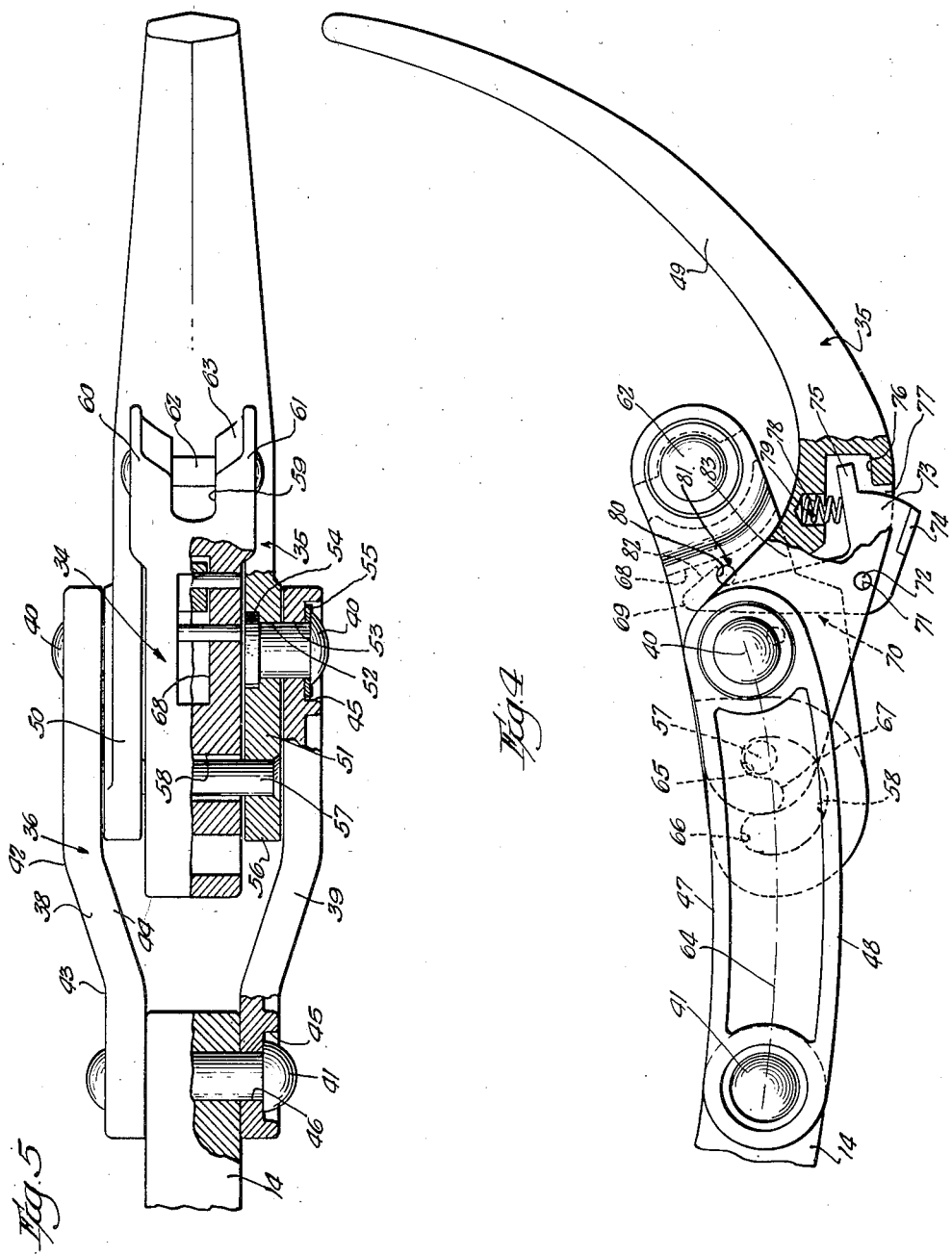
Inventor
David C. Hubbard
By: Robert H. Weult
Atty.

March 7, 1950  D. C. HUBBARD  2,499,753
CHAIN TIGHTENING AND SECURING DEVICE
Filed May 2, 1946  4 Sheets-Sheet 3
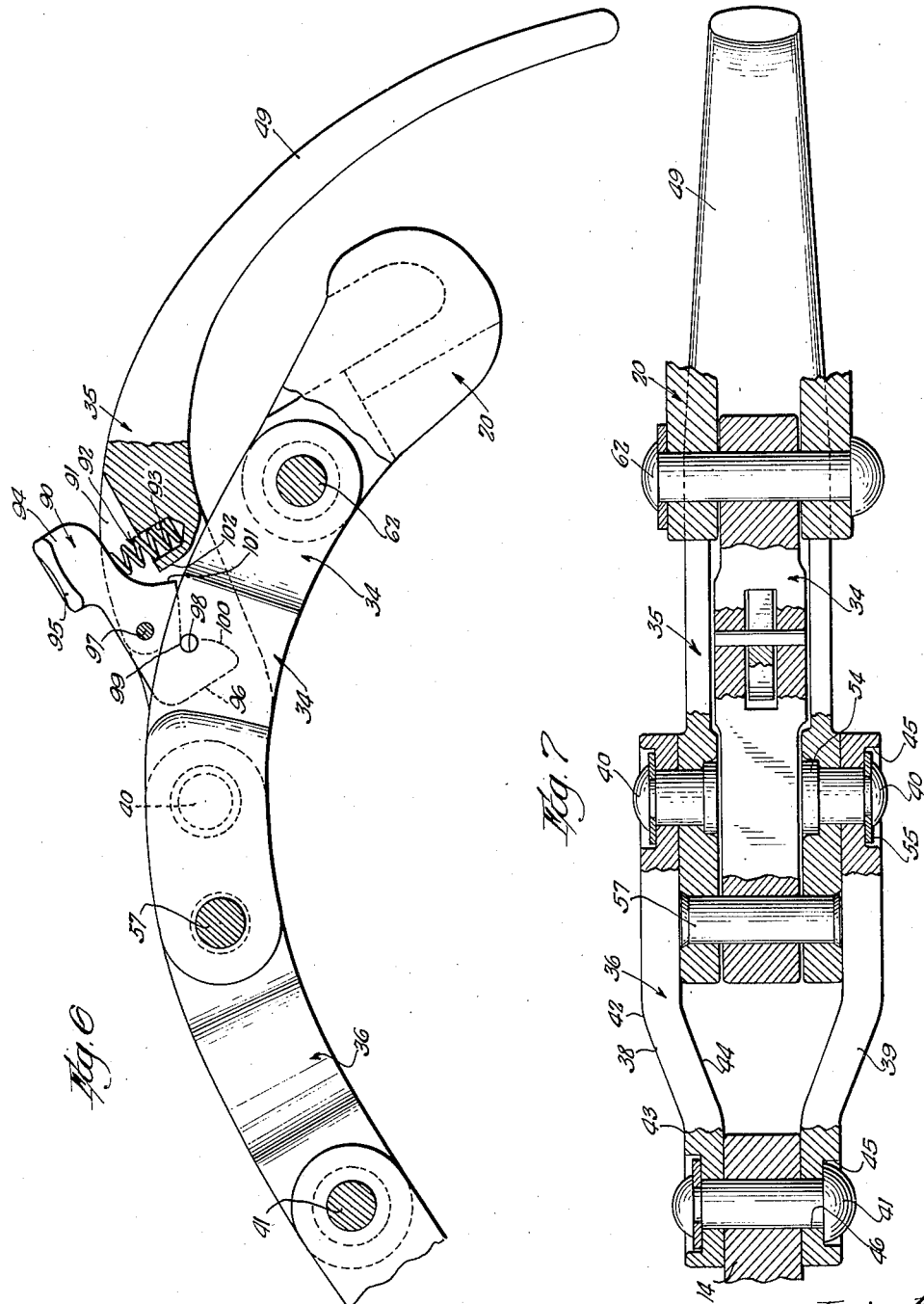
Inventor
David C. Hubbard
By Robert H. Wendt
Atty.

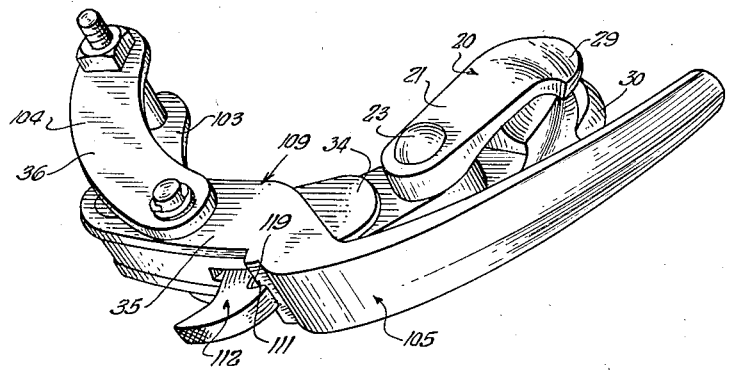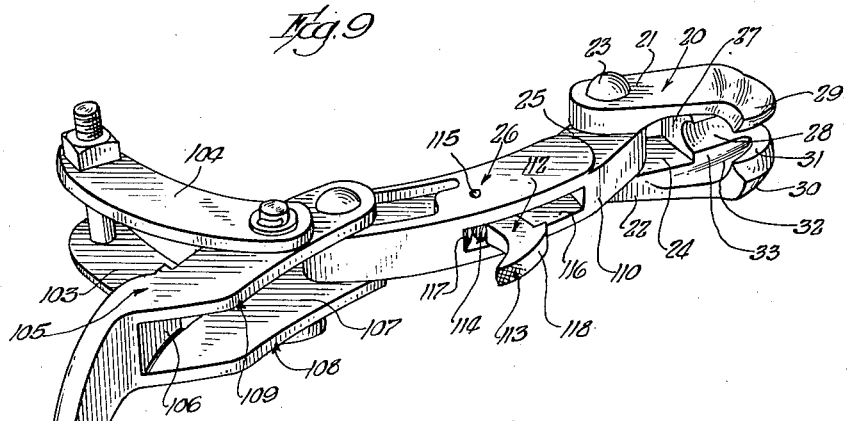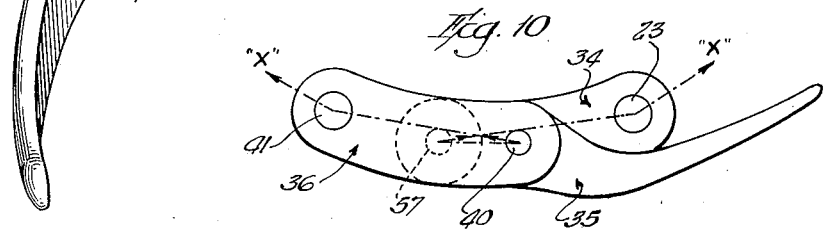

Patented Mar. 7, 1950

2,499,753

UNITED STATES PATENT OFFICE 2,499,753

CHAIN TIGHTENING AND SECURING DEVICE

David C. Hubbard, Centralia, Mo., assignor to A. B. Chance Company, Centralia, Mo., a corporation of Missouri Application May 2, 1946, Serial No. 666,613

11 Claims. (Cl. 248—231)

The present invention relates to chain tightening and securing devices adapted to be used for securing various line tools or equipment to the poles of transmission lines or telephone lines, and is particularly concerned with safety arrangements for tightening a chain about a line pole, and more quickly and easily attaching fittings, such as temporary platforms, maintenance tools, transformer gins, etc.

The present invention relates to improvements in chain tightening devices of the type disclosed in my prior Patent No. 2,309,769, in which a transformer gin is secured to a line pole by means of a chain which is secured at one end to a threaded member, such as a bolt, which has a complementary threaded nut for drawing up the bolt and tightening the chain. Such devices are effective in securing equipment and fittings to the poles, but it requires considerable time to rotate the threaded member to take up the bolt, and such a threaded member does not provide sufficient take-up force, as is evidenced by the fact that it is frequently necessary to retighten the screw after the load has been applied to the equipment.

One of the objects of the invention is the provision of an improved chain tightening and securing device which permits the rapid fastening of equipment to a line pole by eliminating the necessity of separate motions for the taking up of the slack in the chain, such as is necessary with a screw-operated mechanism.

Another object of the invention is the provision of a device of the class described in which, with a single motion of a toggle lever, the chain is quickly tightened and secured in place in such manner that the strain on the chain tends to tighten the device rather than to loosen it, and in which there is provided the additional safety feature, of a locking device for positive assurance that the toggle will not be released inadvertently.

Another object of the invention is the provision of an improved take-up mechanism for securing chains of line platforms, maintenance tools, etc., which provides a greater take-up force sufficient to pull the chain tightly into the surface of a line pole and into such a tight relation with the surface of the pole that there is no possibility of the chain slipping, and no necessity for retightening the mechanism after load has been applied, as the chain has already made an impression in the surface of the wood in which it is anchored.

Another object of the invention is the provision of an improved take-up device for tightening the chain on poles, the device having a quick adjustment for taking up the slack represented by a half length of the chain so as to secure a finer adjustment than can be secured by changing from one link to another. Such a half link adjustment is especially useful on steel poles, where a single link adjustment may move from a too loose condition to a too tight condition in a single step; on steel poles of particularly small diameter the chain may be wrapped around the pole twice, or, sometimes, three times, thus giving a take up adjustment of a one-quarter or a one-sixth step.

Another object of the invention is the provision of an improved take-up device for tightening a chain, which is also provided with latching means for securing it in its final position, and which is so constructed that the force reacting against the chain and take-up device is imposed in such a manner that it tends to hold the device in its locked position so that accidental release of the safety latch will still not cause the device to become loose.

A further object of the invention is the provision of a chain tightener which may be attached more quickly and with less difficulty than the devices of the prior art, which reduces the time required for attachment, which is adapted to be manufactured of light and strong materials, surpassing in strength the strength of the chain itself, and which is provided with a two-fold locking mechanism, each of which is dependent upon the other for the release of the device, and neither of which is operative alone for release, but either of which may effect a locking, for the complete safety of the user.

Other objects and advantages of the invention will be apparent from the following description and the accompanying drawings, in which similar characters of reference indicate similar parts throughout the several views.

Referring to the drawings, of which there are four sheets:

Fig. 4 is a fragmentary top plan view of the chain tightener with the parts in the locked position, showing the details of construction of the toggle levers and latch.

Fig. 5 is a fragmentary side elevational view of the mechanism of Fig. 4, partially broken away to show sections at the various pivot bolts or rivets.

Fig. 6 is a view similar to Fig. 4, of a modification in which the latching lever is carried by the hand lever of the toggle.

Fig. 7 is a fragmentary side elevational view of the mechanism of Fig. 6, partially broken away to show the rivets upon which the levers are pivoted.

Fig. 8 is a view in perspective of another modification, showing the toggle and latch in the locked position.

Fig. 9 is a similar view showing this mechanism in the open position.

Fig. 10 is a diagrammatic plan view of the linkage showing the arrangement of the centers when the toggle is locked on the pole.

Figure 1:
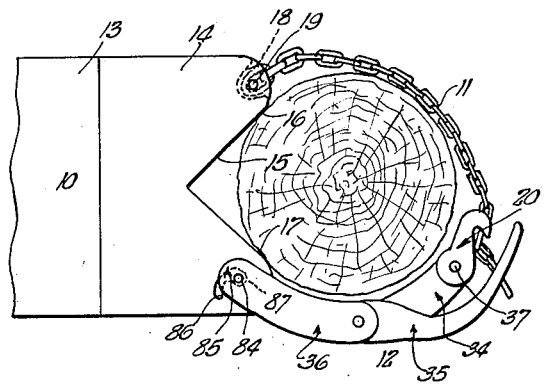
Fig. 1 is a fragmentary top plan view of a pole in section, showing my chain tightening and securing device applied to a platform in one embodiment of the invention.

Referring to Fig. 1, this fragmentary view shows the application of my chain tightening device to a lineman's platform in which 10 indicates the platform in its entirety, 11 the chain, and 12 the chain tightening device. The platform 10 usually includes a board 13 of selected lumber, having its ends secured to a metal fixture 14 which is provided with a V-shaped groove 15 adapted to engage poles of different sizes in such manner that the board is secured against rotative movement on the axis of the seat.

The V-shaped groove 15 also permits the lineman's seat to be secured on the pole with a wedging action, and gives it at least two points of contact, 16 and 17, with widely spaced points on the surface of the pole.

One end of the chain 11 may be secured to the fixture 14 at one of its sides by providing a socket 18 of sufficient size to receive a link of the chain, and providing a rivet 19 which passes from wall to wall of the socket through the end link and is riveted over at both ends.

The chain 11 is preferably of the type having welded links of steel which are slightly greater in their longitudinal dimension than their width, and the other end of the chain may be adjustably secured to the tightening device by means of a chain hook 20 of such structure that it may be pivotally mounted on the tightener, and may be firmly engaged with any link of the chain. Thus the chain and tightener, in the open position, may be pulled as tight as possible by the operator and secured to the tightener.

Referring to Fig. 9, this view in perspective, of a modification, shows the structure of the chain hook 20 in greater detail. Such a chain hook may consist of a cast metal or drop forged metal member having a pair of pivoted flanges 21, 22, provided with aligned apertures for receiving a through bolt or rivet 23, and spaced from each other by means of the slot 24, so that these flanges may receive the end 25 of one of the toggle levers 26. The two pivot flanges 21 and 22 are joined by an integral yoke 27 which is provided on its front side with a partially circular, longitudinally extending groove 28 of sufficient width to receive one of the links of the chain edgewise.

The chain hook 20 also has a pair of forwardly extending flanges 29, 30, which are spaced sufficiently by means of a slot 31 communicating with the groove 28 to provide room for the link which is to go in the groove 28. The forwardly extending flanges 29 and 30 each have on their opposed surfaces a longitudinally extending groove 32, which groove has its flat side surfaces 33 arranged at right angles to the surfaces of the slot 31 which receive one link.

The oppositely disposed grooves 32 are adapted to receive another link of the chain 11 which is retained in these grooves against a longitudinal pull exerted by the chain in a direction outward from the hook in such manner that if the chain is tight, the link in the grooves 32 cannot be dislodged, and the chain is safely secured in the chain hook 20 for all practical purposes. Even the sagging of the lineman's seat 10 on a slack chain 11 will cause the chain to be pulled into the hook 20 so that it cannot be accidentally dislodged.

The grooves 32 may be approximately one half link in depth longitudinally of the hook 20, so that it requires the pulling up of the chain slack, amounting to a half link, to get the secured link in the chain hook, after which this slack remains in the chain and has to be taken up by the chain tightening device.

The chain tightener preferably includes three toggle links (Fig. 1) 34, 35, 36, and the chain hook 20 may be pivotally secured upon one of these links, such as the link 34, by means of a bolt or rivet 37 which passes through both attaching flanges 21, 22, and the link 34 is riveted over at its ends. The link 36, disposed at the opposite end of the chain tightener 12, may consist of a pair of oppositely disposed straps 38, 39, located on the opposite sides of the handle link 35 to which they are pivotally secured by rivets 40 and located on the opposite sides of the fixture 14, to which they are pivotally secured by the rivet 41.

Where the fixture 14 is of lesser thickness than the toggle lever assembly, the link straps 38, 39 may be bent inwardly at 42, and again outwardly at 43, at an obtuse angle, to provide an offset 44, which brings the end portions of each strap into the proper plane for directly engaging the sides of the fixture 14 and handle link 35.

Each of the straps 38, 39 may be provided with a counterbore 45, in addition to the through bores 46, for receiving the head of the rivet and preventing the head from catching on the clothes of the operator. The strap links 38 and 39 are preferably curved edgewise, being provided with the inner curved surface 47 which may approximate the curvature of the periphery of the largest pole on which the device is likely to be used, and as the link is of uniform width, it has an outer curved surface 48 at its outer edge.

The handle link 35 may comprise an elongated cast metal member formed with a curved handle portion 49 which also serves as a yoke for a pair of oppositely disposed toggle link flanges 50, 51. The toggle link flanges 50 and 51 are pivotally secured to the strap links 38, 39 by means of the separate rivets 40 which extend through the registering bores 52, 53, and have their heads located in counterbores 54 and 45. A washer 55 of metal of different characteristics, such as brass or steel, may be used for reducing friction between the head 40 and strap links 38 or 39.

All of the parts of the chain tightener mechanism 12 may be made of a suitable light metal, such as an aluminum or magnesium alloy, having suitable tensile strength, in order to reduce the weight of the assembly, which is of prime importance, since such devices are attached high upon poles and are carried by operators climbing the poles with spurs. In other embodiments, all of the parts may be made of steel, or steel rivets may be employed, with the exception of the catch, which is preferably mounted upon a brass rivet to assure its free pivotal movement.

The pivotal point of attachment of the strap links 38 and 39 on the pivot flanges 50 and 51 of the handle link 35 is located inwardly of the ends 56 of these flanges so that the end portions of these flanges may be pivotally mounted upon the toggle link 34 by means of a single through rivet 57 having both ends riveted over and countersunk in the flanges 51 and passing through a slot 58 in the toggle link 34. This permits the pivotal movement of the handle link 35 to the position of Fig. 9 to extend the tightener, and its movement also to the position of Fig. 8, in which the toggle links overlap each other to tighten the chain.

The handle portion 49 is preferably tapered toward its end, as shown in Figs. 4 and 5, and is preferably curved so that when the toggle is closed, as shown in Fig. 4 or Fig. 8, or in Fig. 1, the handle portion 49 closely follows the contour of the chain tightener on the pole so that it is not likely to catch on loose clothes or equipment carried by the lineman; but the end is spaced sufficiently from the chain hook 20 in Fig. 1 so that the hand of the operator can get under the lever portion 49 to pull the chain tightener open.

The toggle link 34 may consist of a relatively thick strap of metal, which is also curved like the strap links 38 and 39 to conform substantially to a pole, and which is pivotally secured at one end to the chain hook 20 or is itself provided with means for securing the chain. In Fig. 1, link 34 is secured to a chain hook, but in Fig. 5 the link 34 is provided with a longitudinally extending slot 59 of sufficient width to receive the end of a chain link and with a pair of pivot flanges 60, 61 disposed on opposite sides of a link in the groove 59.

Figure 2:
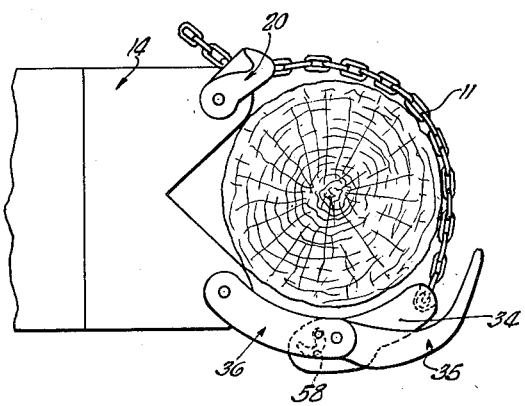
Fig. 2 is a similar view of a modification in which the half link adjustment is located at another point and the chain is permanently attached to the toggle levers instead of being attached to the platform at one end.

A chain link may be permanently attached to the toggle link 34 by a through rivet 62 which passes through the end link of a chain, in which case a chain hook 20, or equivalent device, would have to be provided on the fixture 14 in the manner shown in Fig. 2. Pivot flanges 60, 61 may be beveled on their inner sides at 63 to provide space for the next transverse link, which is at right angles to the link which passes around the rivet 62.

Referring to Fig. 4, the maintenance of the toggle in closed position depends on the location of the pivots represented by the axes 41, 57 and 40. When the toggle is in its closed position the axis of the pivot 57 should be inside the line 64 extending between the axes 40 and 41.

An axial pull exerted on the end of the link 34 and on the end of the link 36, with the centers in this position, will tend to pull the rivet 57 into one of the ends 65 or 66 of the arcuate slot 58 and will tend to keep the toggle in its locked position.

The slot 58 is preferably made arcuate in form, having two retaining notches 65 and 66 separated by a ridge 67, and the effect of this slot is that the link 34 may be pivoted on the pin 57 at the axis of the groove 65 or the axis of the groove 66. These grooves or notches may be separated an amount equal to one half the length of the link, one third the length of the link, or one-quarter the length of the link, depending upon conditions desired. Thus the position of the link 34 may be adjusted with respect to the pin 57 so that another half chain link of slack can be taken up by this adjustment.

When a chain is wrapped twice around a narrow pole, such as a steel pole, a half chain link adjustment at the slot 58 becomes a quarter chain link adjustment when this slack is distributed over two turns about the pole. The user is thus able to make a further adjustment of the chain tightener after he has secured the chain 11 as tightly as possible in a chain hook 20, and before closing the toggle.

The handle 49 of the toggle may then be moved from the position of Fig. 9 to that of Fig. 8 or that of Fig. 1, during which movement the chain will be tightened, and will be caused to embed itself slightly in the wood of the pole so that the fixture or apparatus to be secured is very firmly chained to the pole.

Referring to Fig. 10, the position of the toggle levers 34, 35, 36 is illustrated here with dot-dash lines showing the lines of centers. The centers of the rivets or bolts 23, 41, 57, and 40 are the axes between which these lines are drawn. When center of pivot 57 and center of pivot 40 are outside of the dot-dash lines 40, 41, 23, and 57, then the tendency of the chain pull is to pull the toggle into locked position.

In order to have absolute assurance that the toggle will not be inadvertently unlocked, the toggle actuating lever 49 is preferably provided with latching means for securing it in locked position to the link 34. For this purpose the link 34 may be provided with a through slot 68 which tapers from the bottom side toward the top side in Fig. 4, and which is adapted to receive the latching end 69 of a pivoted latch 70.

The latch 70 may consist of a metal member of angular form, having a through bore 71 for receiving a rivet 72 which pivotally mounts the latch on the lever 35. Latch 70 also has two angular extensions, one extended to form the latching end 69 and another extended to form the thumb lever 73.

The thumb lever 73 may have a laterally extending flange 74 at its bottom side in Fig. 4 to provide a wider surface for engagement with the thumb. It may also have an outwardly extending stop lug 75 for engagement with a shoulder 76 to limit the pivotal movement of this latching lever 70. In order to mount the latching lever 70 the lever 35 is also provided with a slot, one wall of which is indicated at 77, leaving two flanges between which the latch 70 may be pivotally mounted on the rivet 72.

In addition to the slot 77, lever 35 has a cylindrical bore 78 forming a socket for receiving a helical compression spring 79 which engages one end of the bore and reacts against the angular extension 73 of latch 70, urging it into latching position. At its latching end the latch 70 is formed with a retaining hook having a latching surface 80 which may be slightly curved to give the latch a tendency to be retained on the latching pin 81.

Latching pin 81 may be a rivet carried by link 34 and extending from side to side of the slot 68. Latch 70 also has a beveled camming surface 82 on the side toward the pin 81, and the stop 75 limits the motion of the latch 70 so that it will always engage the pin 81 on its camming surface 82. Thus when the lever 35 is moved to the position of Fig. 4, the latch 70 is automatically cammed in a counter-clockwise direction until it passes the pin 81, when the spring 79 urges it into the latching position where it is held by the spring.

At this time, a flat surface 83 at the base of the two flanges 50 and 51 on lever 35 has engaged the lower edge of the link 34 in Fig. 4, preventing the toggle from moving farther in this direction. Thus the chain tightener is held in its secured position not only by the tendency of the toggle which is pulled tighter by the tension of the chain, but it is held by the latch 70, which positively prevents movement of the toggle actuating lever 35 unless the latch is simultaneously released by means of the thumb.

Referring to Fig. 2, this modification of the invention illustrates the use of the half-link adjustment groove 58 at the point exemplified in Fig. 4.

In the embodiment of Fig. 1, the fixture 14 is provided with such a half-link adjustment groove for the pin 84, the groove being indicated by numeral 85. The two notches 86 and 87 of the arcuate groove 85 should be turned toward the direction in which a pull is placed upon the fixture 14 by the chain tightener, as shown in Fig. 1.

Figure 3:
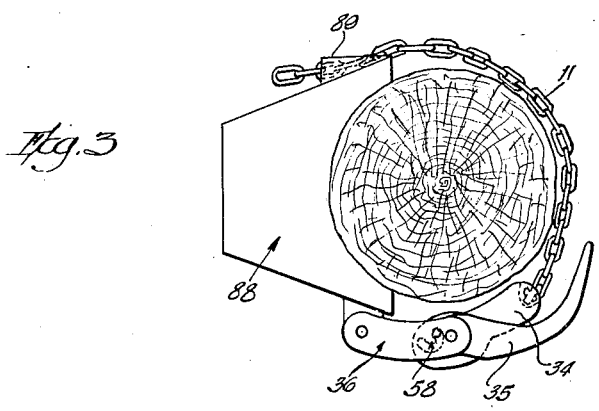
Fig. 3 is a similar view of another modification showing the use of the chain tightener with a base for a transformer gin utilizing another form of chain securing device.

Referring to Fig. 3, this is a modification in which the chain is fixedly secured to the chain tightener, as illustrated in Fig. 5, but the fixture 88 in this case is provided with a laterally extending lug 89 which has grooves arranged at right angles to each other like the grooves 32 and 31 of the chain hook 20 for securing that end of the chain. In this case, the half-link adjustment groove 58 forms a part of the chain tightener toggle and assembly illustrating the fact that either end of the chain may be permanently attached either to the fixture or the chain tightener, and that the half-link chain adjustment groove may be located at different points.

Referring to Figs. 6 and 7, these are views showing a modification which is provided with a slightly different form of latch. In this case the latch 90 is pivotally mounted in a slot 91 in the lever 35 and engaged by a helical compression spring 92 located in socket 93. Latch 90 has an outwardly projecting part 94 provided with lateral flanges 95, providing a wide thumb-engaging surface, and has a latching extension 96 on the opposite side of a pivot pin 97 with a partially cylindrical hook formation 98 for engaging the latching pin 99. Latching pin 99 is again carried by flanges on the opposite side of a slot in the lever 34, the slot permitting the insertion of the latching end 96.

The latching portion 96 also has a beveled camming surface 100 for engaging the pin 99, and this camming surface 100 is held in proper position to engage the pin 99 by stopping engagement between a shoulder 101 on the latch and a shoulder 102 on the lever 35.

Figs. 8 and 9 show another modification in which the strap links 103, 104 are straight, as the fixture which they engage is of the same thickness as the toggle actuating lever 105. This toggle actuating lever is of substantially the same shape as lever 35, previously disclosed, but it has a curved, partially cylindrical surface 106 at the base of the slot 107 between the flanges 108 and 109, which serves as a stop for engaging the curved edge 110 of the toggle link 26.

Referring to Fig. 8, the outer surface 111, located adjacent the stop surface 106, serves as a keeper for engagement with the latch 112, which, in this case, is pivotally mounted on the link 26. Latch 112 has a knurled thumb surface 113 for engagement by the thumb to move it clockwise in Fig. 9 or Fig. 8, against the compression of spring 114.

Latch 112 is pivotally mounted on a pin 115, and is located in slot 116 and has a stop end located oppositely to the thumb-piece 113 for engaging the end 117 of the slot 116 and limiting its pivotal motion in a counter-clockwise direction.

In addition to the knurled thumb-engaging portion 113, latch 112 has a curved camming surface 118 which is engaged by the edge of the yoke 106 to move the latch in a clockwise direction as the lever 105 is closed to the position of Fig. 8. Then the stop surface 106 engages edge 110 of link 26, and the latch 112 is moved over until its latching surface 119 engages on the keeper 111 to hold the toggle actuating lever 105 in the position of Fig. 8.

It will thus be observed that I have invented an improved form of chain tightener employing toggle links which act on the chain as a tightener with a considerable leverage, due to the length of the actuating lever portion 49 so that the chain may be made very tight with a single motion of the lever 35 from the position of Fig. 9 to that of Fig. 8. When the toggle is moved to the tightening position, it also moves past the position of dead center, so that the tension placed on the chain tends to pull the toggle more tightly into its locked position.

The present tightener also preferably employs an auxiliary thumb latch on the toggle actuating lever so that this lever cannot be inadvertently pulled outward to open the toggle without releasing the thumb latch.

The present chain tightener permits the fastening of equipment to a line pole immediately by permitting most of the slack to be taken up by the first securement of the chain, and then a further adjustment by means of the half-link slot adjustment. The chain may then be secured about the pole with a minimum amount of effort, and in the shortest time, since it is only necessary to move the toggle lever over into the closed position, where it is automatically latched.

The semi-circular slot adjustment shown has the advantage of being the most economical means of obtaining a half link adjustment in length of the assembly about the pole. It is more simple to operate and more economical to manufacture than any other device for securing this result.

It is of the utmost importance that the operation of securing the chain and tightening it be made as simple as possible, because the lineman at this time is supported on a pole either by means of the foot cleats or by means of his spurs. Although maintained in an erect position by his belt, the weight of a lineman's seat renders the securing of the chain a difficult operation with the devices of the prior art.

Where the device is applied to a steel pole which does not permit the tightening of the chain until the links dig in, as they do on a wooden pole, the chain may be wrapped twice around the pole, thus distributing the slack over two turns. Thus the present chain tightener, with its half-link adjustment, provides a very tight attachment of the chain about both types of poles.

The present chain tightener is light and strong, and may be made stronger than the chain itself so that a high factor of safety is provided not only in the strength of the materials employed, but in the two-fold locking action and by the adjustment which is provided by this device.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a chain tightener for tightening and fastening a securing chain about a line pole, tower, or the like, for the purpose of securing maintenance equipment and the like thereon, the combination of end links and an intermediate link, said end links being pivotally mounted on said intermediate link, and said intermediate link having an outwardly projecting handle portion, said end links adapted to be pivotally attached to said equipment on one side, the other of said end links adapted to receive the end links of a chain, the intermediate link having a half chain link adjustment comprising an arcuate slot formed in said intermediate link and engaging a pin carried by one end link, said slot having two end bearing portions for said pin to vary the effective length of the assembly an amount equivalent to the length of a half chain link, and said handle being movable from an open position in which the linkage assumes expanded length to a closed position adjacent one of the end links in which the linkage assumes a minimum length according to said adjustment to take up slack in the chain and tighten it about a pole.

2. In a chain tightener for tightening and fastening a securing chain about a line pole, tower, or the like, for the purpose of securing maintenance equipment and the like thereon, the combination of end links and an intermediate link, said end links being pivotally mounted on said intermediate link, and said intermediate link having an outwardly projecting handle portion, said end links adapted to be pivotally attached to said equipment on one side, the other of said end links adapted to receive the end links of a chain, the intermediate link having a half chain link adjustment comprising an arcuate slot formed in said intermediate link and engaging a pin carried by one end link, said slot having two end bearing portions for said pin to vary the effective length of the assembly an amount equivalent to the length of a half chain link, and said handle being movable from an open position in which the linkage assumes expanded length to a closed position adjacent one of the end links in which the linkage assumes a minimum length according to said adjustment to take up slack in the chain and tighten it about a pole, and latching means for holding said intermediate link in the said closed position.

3. In a chain tightener for tightening and fastening a securing chain about a line pole, tower, or the like, for the purpose of securing maintenance equipment and the like thereon, the combination of end links and an intermediate link, said end links being pivotally mounted on said intermediate link, and said intermediate link having an outwardly projecting handle portion, said end links adapted to be pivotally attached to said equipment on one side, the other of said links adapted to have pivotally mounted thereon means for adjustably engaging a chain, the intermediate link of said tightener having a half chain link adjustment comprising an arcuate slot formed in said intermediate link and engaging a pin carried by one end link, said slot having two end bearing portions for said pin to vary the effective length of the assembly an amount equivalent to the length of a half chain link, and said handle being movable from an open position in which the linkage assumes expanded length to a closed position adjacent one of the end links in which the linkage assumes a minimum length according to said adjustment to take up slack in the chain and tighten it about the pole.

4. In a chain tightener for tightening and fastening a securing chain about a line pole, tower, or the like, for the purpose of securing maintenance equipment and the like thereon, the combination of end links and an intermediate link, said end links being pivotally mounted on said intermediate link, and said intermediate link having an outwardly projecting handle portion, said end links adapted to be pivotally attached to said equipment on one side, the other of said links adapted to have pivotally mounted thereon means for adjustably engaging a chain, the intermediate link of said tightener having a half chain link adjustment comprising an arcuate slot formed in said intermediate link and engaging a pin carried by one end link, said slot having two end bearing portions for said pin to vary the effective length of the assembly an amount equivalent to the length of a half chain link, and said handle being movable from an open position in which the linkage assumes expanded length to a closed position adjacent one of the end links in which the linkage assumes a minimum length according to said adjustment to take up slack in the chain and tighten it about the pole, and latching means for holding said intermediate link in the said closed position.

5. In a chain tightener assembly for fastening a chain or the like about a pole, the combination of a chain with a tightening mechanism, means for connecting one end of the chain to said tightening mechanism, means for connecting the other end of the chain to the tightening mechanism at any of a plurality of the chain links, and a half link adjustment interposed in said assembly comprising a slot formed in one member and a movable connecting part in said slot, said slot having two positions for said part to vary the effective length of the assembly an amount equivalent to the length of a half link.

6. In a chain tightener assembly, the combination of a curved handle member adapted to lie close to a pole on which the assembly is secured, said handle having a longitudinal slot extending into one end, separating two flanges, a toggle link having one end between said flanges, a pivot pin joining said flanges and passing through said toggle link having means for securement to a tension member, and said toggle link having a slot for receiving said pin, said slot being arcuately curved and having at each of its ends a stable pin receiving position in which the pin bears against the side walls of the slot to exert a pull on said toggle link, and whereby the toggle link has two different effective lengths, and a pair of strap members having means at one end for joining them together and securing them to said tension member, said strap members being mounted pivotally on the outside of said flanges on substantially the same axis, and the pin and pivots of said straps having their axes so located that the pull of said tension member tends to pull the strap pivots inside the pin axis in toggle latched position.

7. A chain tightener assembly, according to claim 6, in which the additional safety feature is included of a separate latching means operating between said handle and said toggle link for assuring the toggle link being maintained in said toggle latching position.

8. A chain tightener assembly, according to claim 7, in which the separate latching means is spring urged into the latching position, whereby the handle is doubly and automatically secured when moved into the toggle latched position.

9. In a chain tightening mechanism, the combination of a handle member, said handle member being provided at one end with a longitudinally extending slot separated by a pair of longitudinal flanges, and a transverse pin carried by said flanges adjacent their ends and remote from the free end of said handle, a pair of metal straps pivotally mounted on the outside of said flanges on a common axis which is between the free end of the handle and said pin and closely adjacent to said pin, said straps having their opposite ends pivotally joined together and secured to a part carried by the chain to be tightened, and a third link having means at one end for securement to the chain, said third link being located between said longitudinal flanges at its opposite end and being provided at said opposite end with an elongated slot having its ends provided with a pair of partial bearings for said pin, the pivoting of said handle on said straps moving said pin and link from a position in which the mechanism is elongated to a position in which the mechanism is shortened, and the said latter slot providing a pair of positions of different length for said mechanism.

10. In a chain tightening mechanism, the combination of a handle member, said handle member being provided at one end with a longitudinally extending slot separated by a pair of longitudinal flanges, and a transverse pin carried by said flanges adjacent their ends and remote from the free end of said handle, a pair of metal straps pivotally mounted on the outside of said flanges on a common axis which is between the free end of the handle and said pin and closely adjacent to said pin, said straps having their opposite ends pivotally joined together and secured to a part carried by the chain to be tightened, and a third link having means at one end for securement to the chain, said third link being located between said longitudinal flanges at its opposite end and being provided at said opposite end with an elongated slot having its ends provided with a pair of partial bearings for said pin, the pivoting of said handle on said straps moving said pin and link from a position in which mechanism is elongated to a position in which the mechanism is shortened, and the said latter slot providing a pair of positions of different length for said mechanism, the said latter slot being arcuately curved and extending over more than 180 degrees and having both of its partial bearing formations located to engage the pin when the pin is past the line of centers of the pivotal points of said strap.

11. In a chain tightening mechanism, the combination of a handle member, said handle member being provided at one end with a longitudinally extending slot separated by a pair of longitudinal flanges, and a transverse pin carried by said flanges adjacent their ends and remote from the free end of said handle, a pair of metal straps pivotally mounted on the outside of said flanges on a common axis which is between the free end of the handle and said pin and closely adjacent to said pin, said straps having their opposite ends pivotally joined together and secured to a part carried by the chain to be tightened, and a third link having means at one end for securement to the chain, said third link being located between said longitudinal flanges at its opposite end and being provided at said opposite end with an elongated slot having its ends provided with a pair of partial bearings for said pin, the pivoting of said handle on said straps moving said pin and link from a position in which the mechanism is elongated to a position in which the mechanism is shortened, and the said latter slot providing a pair of positions of different length for said mechanism, the said latter slot being arcuately curved and extending over more than 180 degrees and having both of its partial bearing formations located to engage the pin when the pin is past the line of centers of the pivotal points of said strap, and a pivoted latch member spring pressed into latching position and cooperating with a keeper member, said latter members being mounted on the handle and third link for holding them latched when the mechanism is in its shortened position.

DAVID C. HUBBARD.

REFERENCES CITED

The following references are of record in the file of this patent:

UNITED STATES PATENTS

| Number | Name | Date |
| --- | --- | --- |
| 882,850 | Troell | Mar. 24, 1908 |
| 1,342,626 | Frank | June 8, 1920 |
| 1,542,548 | Gordon | June 16, 1925 |
| 1,826,120 | Booth | Oct. 6, 1931 |
| 1,849,789 | Coffing | Mar. 15, 1932 |
| 2,089,370 | Heinrich | Aug. 10, 1937 |
| 2,309,769 | Hubbard | Feb. 2, 1943 |